United States Patent
Adachi

(10) Patent No.: US 10,479,415 B2
(45) Date of Patent: Nov. 19, 2019

(54) VEHICULAR PANEL STRUCTURE

(71) Applicant: TOYOTA JIDOSHA KABUSHIKI KAISHA, Toyota-shi, Aichi-ken (JP)

(72) Inventor: Yoshiyuki Adachi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 51 days.

(21) Appl. No.: 15/854,084

(22) Filed: Dec. 26, 2017

(65) Prior Publication Data

US 2018/0194407 A1   Jul. 12, 2018

(30) Foreign Application Priority Data

Jan. 12, 2017   (JP) .................................. 2017-003290

(51) Int. Cl.
*B62D 27/02*   (2006.01)
*B62D 25/08*   (2006.01)

(52) U.S. Cl.
CPC ........... *B62D 27/026* (2013.01); *B62D 25/08* (2013.01)

(58) Field of Classification Search
CPC ......... B62D 27/026; B62D 25/08; B60J 5/101
See application file for complete search history.

(56) References Cited

U.S. PATENT DOCUMENTS

2015/0266518 A1* 9/2015 Donabedian ......... B62D 27/026
296/210

FOREIGN PATENT DOCUMENTS

JP   H01-057971 U   4/1989
JP   2014-083904 A   5/2014

* cited by examiner

*Primary Examiner* — D Glenn Dayoan
*Assistant Examiner* — Melissa Ann Bonifazi
(74) *Attorney, Agent, or Firm* — Oliff PLC

(57) ABSTRACT

A vehicular panel structure includes an inner panel disposed on an inner side of a vehicle; an outer panel disposed on an outer side of the inner panel in the vehicle, having a linear expansion coefficient different from a linear expansion coefficient of the inner panel, and having an adhesive surface joined by an adhesive to an adhesive surface of the inner panel; and an affixed member affixed to a part of the adhesive surface of the outer panel. The affixed member is configured to adhere less to the adhesive than to the adhesive surface of the inner panel or the adhesive surface of the outer panel to which the affixed member is affixed.

8 Claims, 13 Drawing Sheets

VEHICULAR PANEL STRUCTURE

INCORPORATION BY REFERENCE

The disclosure of Japanese Patent Application No. 2017-003290 filed on Jan. 12, 2017 including the specification, drawings and abstract is incorporated herein by reference in its entirety.

BACKGROUND

1. Technical Field

The disclosure relates to a vehicular panel structure.

2. Description of Related Art

Japanese Unexamined Patent Application Publication No. 2014-083904 (JP 2014-083904 A) discloses a structure in which a one-side adhesive portion adhering to either an inner panel or an outer panel is disposed by a part of the inner panel or the outer panel not being subjected to a primer treatment in a vehicular panel member in which the inner panel and the outer panel with different linear expansion coefficients are joined to each other by an adhesive. In the configuration described above, the thermal distortion of the panels is further suppressed by the disposition of the one-side adhesive portion adhering to either the inner panel or the outer panel. Japanese Unexamined Utility Model Application Publication No. 01-057971 (JP 01-057971 U) discloses a vehicular panel structure in which an elastic member is interposed between an inner panel and an outer panel, an adhesive portion is provided on one side surface of the elastic member, and the adhesive portion adheres to at least one of the inner panel and the outer panel.

SUMMARY

In the vehicular panel member that is disclosed in JP 2014-083904 A, the positional variation of the one-side adhesive portion may increase in a case where the one-side adhesive portion is disposed by a part of the inner panel or the outer panel not being subjected to a primer treatment.

The disclosure provides a vehicular panel structure with which the positional variation of a non-adhesive portion can be appropriately suppressed and the panel distortion that is attributable to a difference in a linear expansion coefficient can be effectively suppressed.

An aspect of the disclosure relates to a vehicular panel structure including an inner panel disposed on an inner side of a vehicle, an outer panel disposed on an outer side of the inner panel, and an affixed member. The outer panel has a linear expansion coefficient different from a linear expansion coefficient of the inner panel, and has an adhesive surface joined by an adhesive to an adhesive surface of the inner panel. The affixed member is affixed to a part of the adhesive surface of the inner panel or the adhesive surface of the outer panel. The affixed member is configured to adhere less to the adhesive than to the adhesive surface of the inner panel or the adhesive surface of the outer panel to which the affixed member is affixed.

According to the aspect of the disclosure, the linear expansion coefficient of the outer panel differs from the linear expansion coefficient of the inner panel and the adhesive surface of the outer panel is joined to the adhesive surface of the inner panel by the adhesive. The affixed member is affixed to a part of the adhesive surface of the inner panel or the adhesive surface of the outer panel. The affixed member adheres less to the adhesive than to the adhesive surface of the inner panel or the adhesive surface of the outer panel to which the affixed member is affixed. In the configuration described above, the affixed member is affixed to a part of the adhesive surface of the inner panel or the adhesive surface of the outer panel and the affixed member has a relatively low level of adhesiveness with the adhesive. As a result, in the region to which the affixed member is affixed, a state occurs where the inner panel or the outer panel is not bound by the adhesive. In other words, a state of almost no adhesion (non-adhesive portion) occurs in the region. Accordingly, the distortion that is attributable to the difference between the linear expansion coefficients of the inner panel and the outer panel can be effectively avoided. In addition, the dimension of the affixed member and the position to which the affixed member is affixed can be adjusted with ease, and thus positional variations can be reduced compared to, for example, a configuration in which a one-side adhesive portion is disposed as a result of a primer treatment.

In the vehicular panel structure according to the aspect of the disclosure, the adhesive may cause an outer edge of the inner panel and an outer edge of the outer panel to adhere to each other, and the affixed member may be disposed at a part of the outer edge of the inner panel or the outer edge of the outer panel.

According to the aspect of the disclosure, the outer edge of the inner panel and the outer edge of the outer panel are caused to adhere to each other by the adhesive. Accordingly, adhesiveness is ensured between the inner panel and the outer panel. In addition, by the affixed member being disposed at a part of the outer edge of the inner panel or the outer edge of the outer panel, a state (state of almost no adhesion) occurs where a part of the outer edge of the inner panel or the outer edge of the outer panel is not bound by the adhesive. As a result, the distortion that is attributable to the difference between the linear expansion coefficients of the inner panel and the outer panel can be more effectively avoided with adhesiveness ensured between the inner panel and the outer panel.

In the vehicular panel structure according to the aspect of the disclosure, a stepped portion may be disposed on at least a part of the inner panel and the outer panel, and the affixed member may be disposed adjacent to the stepped portion.

According to the aspect of the disclosure, the stepped portion is disposed on at least a part of the outer panel and the inner panel and the affixed member is disposed adjacent to the stepped portion. Although stress concentration, and distortion in particular, are likely to occur in the vicinity of the stepped portion of the outer panel or the inner panel, the distortion that is attributable to the difference between the linear expansion coefficients of the inner panel and the outer panel can be more effectively avoided as the affixed member is disposed adjacent to the stepped portion.

In the vehicular panel structure according to the aspect of the disclosure, the inner panel and the outer panel may constitute a door of the vehicle, and the affixed member may be disposed in a lower end portion of the door in an up-down direction of the vehicle.

According to the aspect of the disclosure, the inner panel and the outer panel constitute the door of the vehicle. In the region of the outer panel or the inner panel to which the affixed member is affixed, a state (state of almost no adhesion) occurs where either the outer panel or the inner panel is not bound by the adhesive while the adhesive is in close contact with the outer panel or the inner panel. The affixed member is disposed in the lower end portion of the door in the up-down direction of the vehicle, and thus the dew condensation water generated in the door can be discharged by oozing out between the affixed member and the adhesive and dust and sound movements into the cabin of the vehicle can be further suppressed.

In the vehicular panel structure according to the aspect of the disclosure, the affixed member may be affixed to the outer panel side, the outer panel side being a design surface side.

According to the aspect of the disclosure, the affixed member is affixed to the outer panel side, the outer panel side being a design surface side, and distortion of the outer panel as a design surface can be more effectively avoided.

In the vehicular panel structure according to the aspect of the disclosure, the affixed member may be configured of a plastic film.

In the vehicular panel structure according to the aspect of the disclosure, the affixed member may be a resin-molded article and may be provided with a plurality of planar joined portions and a plurality of recessed portions molded in an intermediate portion of the planar joined portions.

In the vehicular panel structure according to the aspect of the disclosure, the joined portions of the affixed member may be joined to the adhesive surface of the outer panel at a position of a rear side vertical wall portion of the outer panel adjacent to a stepped portion such that recessed parts of the recessed portions pass along an up-down direction of the vehicle.

With the vehicular panel structure according to the aspect of the disclosure, the positional variation of the non-adhesive portion can be appropriately suppressed and the panel distortion that is attributable to the difference in the linear expansion coefficient can be effectively suppressed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A vehicular panel structure according to embodiments of the disclosure will be described with reference to accompanying drawings. The arrows FR, UP, RH, and LH that are appropriately shown in each of the drawings represent the forward direction, the upward direction, the rightward direction, and the leftward direction of a vehicle to which the vehicular panel structure according to the embodiments of the disclosure is applied, respectively. The rightward and leftward directions are directions with respect to the forward direction. Unless otherwise noted, the front-rear, up-down, and right-left directions mentioned in the following description represent the front-rear direction in the front-rear direction of the vehicle, the up-down direction in the up-down direction of the vehicle, and the right-left direction in the right-left direction of the vehicle (width direction of the vehicle) with respect to the forward direction, respectively.

First Embodiment

Hereinafter, a back door to which a vehicular panel structure according to a first embodiment is applied will be described with reference to FIGS. 1 to 8.

Figure 1:
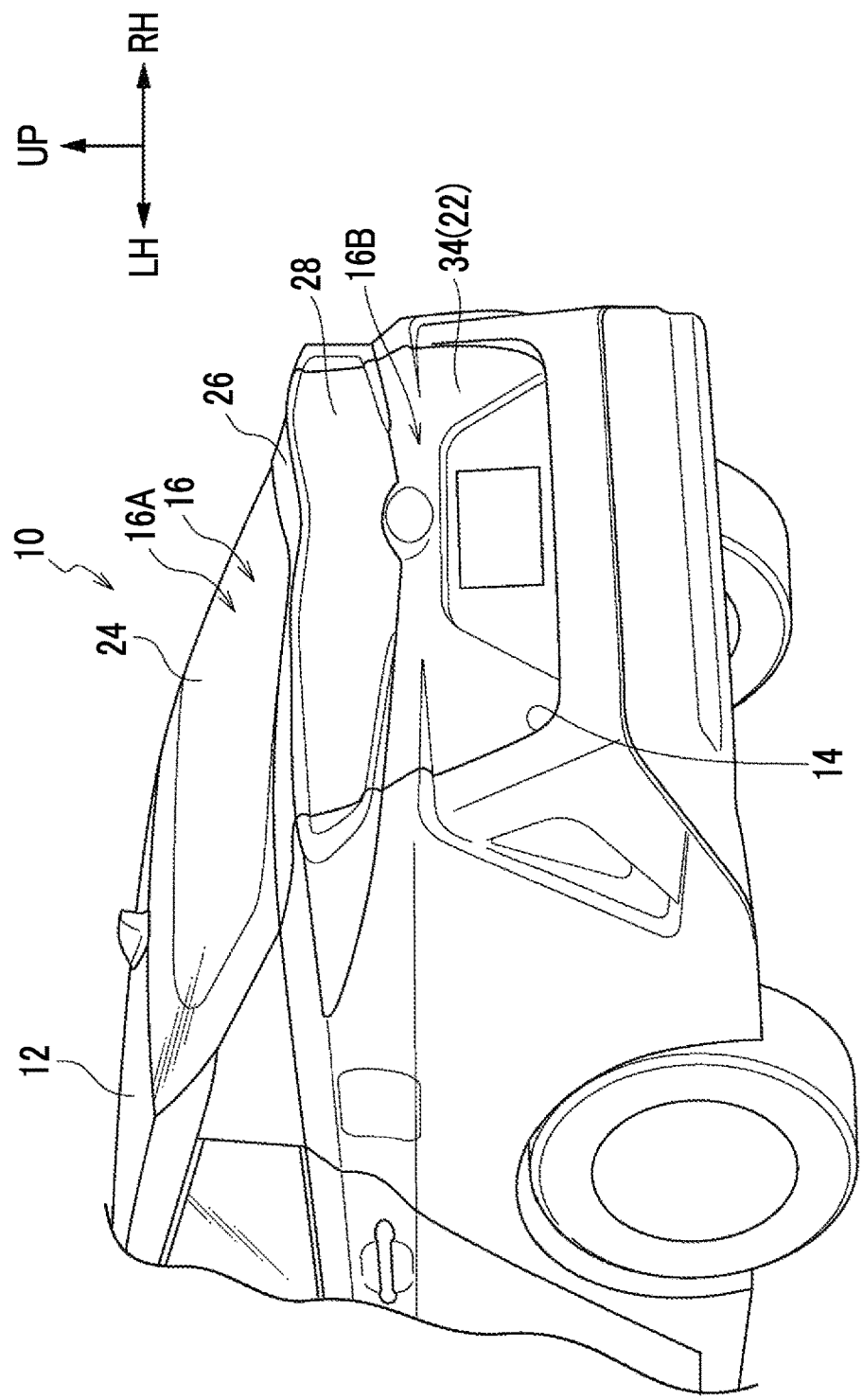
FIG. 1 is an oblique perspective view in which a vehicle provided with a back door to which a vehicular panel structure according to a first embodiment is applied is obliquely seen from its rear side.

A vehicle 10 is illustrated in FIG. 1. The vehicle 10 is configured to include a vehicle body 12 and a back door 16 as an example of the doors of the vehicle. As illustrated in FIG. 1, a door opening portion 14 open in the front-rear direction of the vehicle is formed at the rear end of the vehicle body 12. In the vehicle body 12, a door hinge 18 (refer to FIG. 2) is disposed in the upper edge portion of the door opening portion 14 and an upper edge portion 32D (refer to FIG. 2) of an inner panel 32 (described later). The door hinge 18 supports the back door 16 such that the back door 16 is capable of rotating about its axis direction in the width direction of the vehicle.

Figure 2:
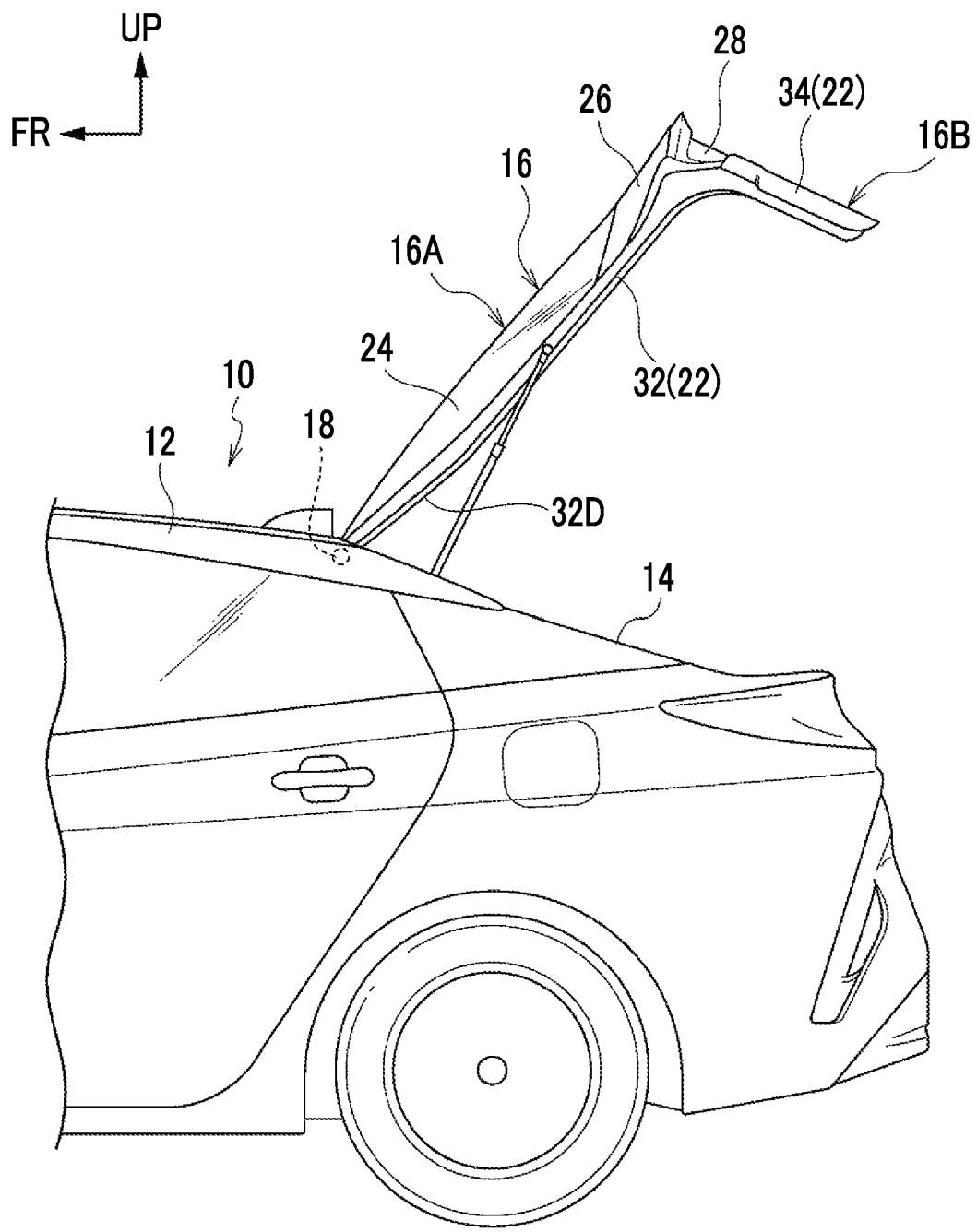
FIG. 2 is a side view illustrating a state where the back door to which the vehicular panel structure according to the first embodiment is applied is disposed at an open position.

The back door 16 is capable of opening and closing the door opening portion 14 by rotating about the door hinge 18 (refer to FIG. 2). FIG. 1 shows a closed position, at which the door opening portion 14 is closed by the back door 16. FIG. 2 shows an open position, at which the back door 16 is open with respect to the door opening portion 14.

As illustrated in FIG. 2, the back door 16 is formed in a substantially L-shape in side view of the vehicle. In a state where the back door 16 is disposed at the closed position, the upper and rear parts of the door opening portion 14 are closed by the back door 16. As illustrated in FIG. 1, the back door 16 is provided with a door upper portion 16A and a door lower portion 16B. The door upper portion 16A gently and obliquely extends rearward and downward from an upper end portion in the up-down direction of the vehicle and the door lower portion 16B drops downward from the rear end portion of the door upper portion 16A in the front-rear direction of the vehicle (refer to FIG. 1). The disposition of each of the portions that constitute the back door 16 will be described on the assumption that the back door 16 is disposed at the closed position.

As illustrated in FIGS. 1 and 2, the back door 16 is configured to include a back door body 22, a rear window 24 disposed on the upper portion side of the back door 16, a rear spoiler 26 disposed on the rear side of the rear window 24, and a lower window 28 for a small window disposed on the lower side of the rear spoiler 26. The rear window 24 is disposed in the door upper portion 16A and the lower window 28 is disposed in the upper portion of the door lower portion 16B. The rear spoiler 26 is disposed between the rear window 24 and the lower window 28.

Figure 3:
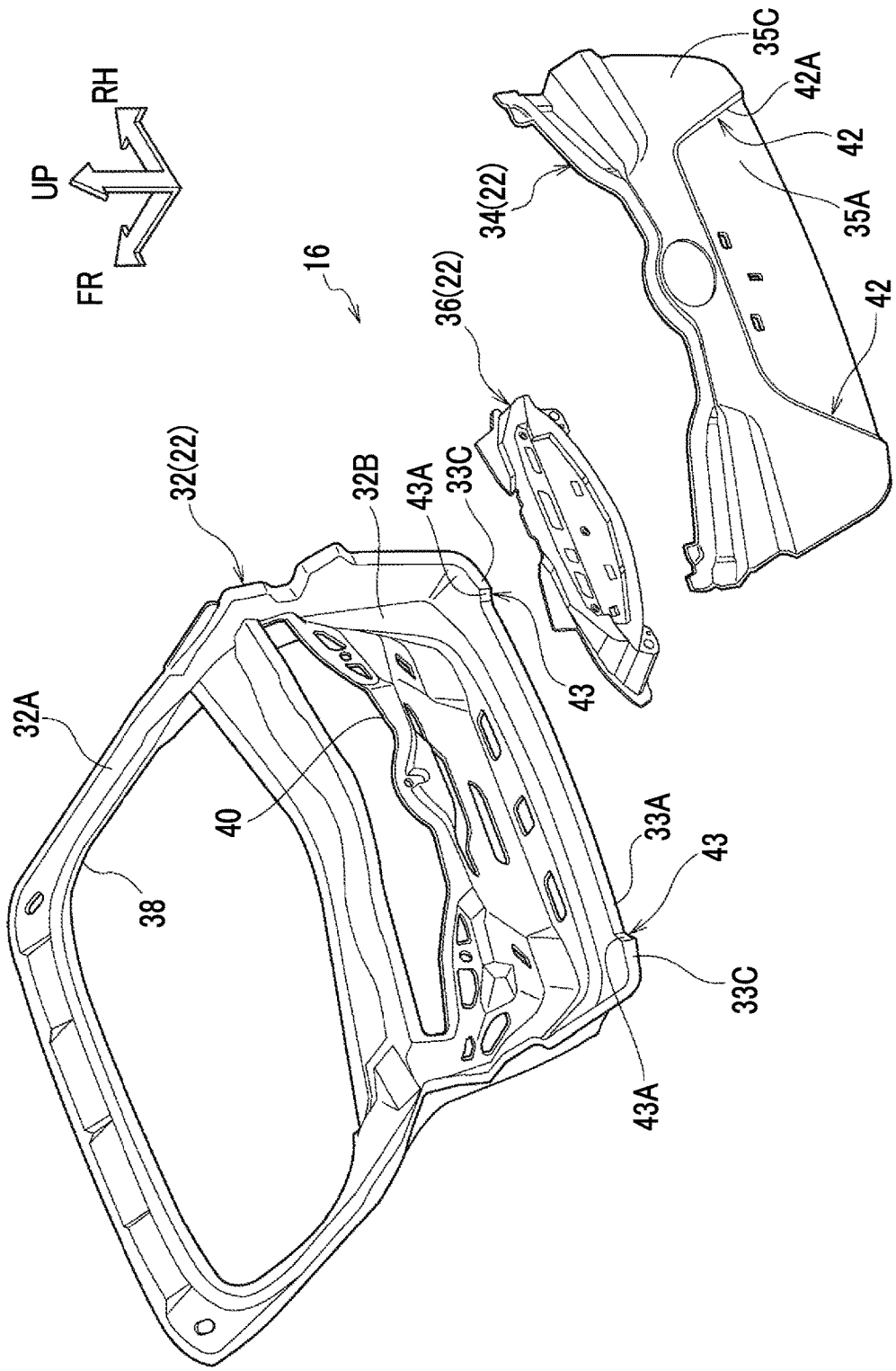
FIG. 3 is an exploded perspective view illustrating an outer panel and an inner panel used in the back door to which the vehicular panel structure according to the first embodiment is applied.

A vehicular panel structure S20 (refer to FIG. 4 and so on) according to the first embodiment is applied to the back door 16 as illustrated in FIG. 3. The back door body 22 is provided with the inner panel 32 and an outer panel 34. The inner panel 32 constitutes a part of the back door 16 and is disposed on the inner side of the vehicle. The outer panel 34 constitutes a part of the back door 16 and is disposed on an outer side of the vehicle. The back door body 22 is also provided with an extension 36 disposed between the inner panel 32 and the outer panel 34.

The inner panel 32 is a panel member that constitutes a main part of the back door body 22. The inner panel 32 is formed in a substantially L-shape in side view of the vehicle. The inner panel 32 is provided with an upper portion 32A disposed in the door upper portion 16A (refer to FIGS. 1 and 2) and a lower portion 32B disposed in the door lower portion 16B (refer to FIGS. 1 and 2). The inner panel 32 is provided with an upper side opening portion 38 formed in the upper portion 32A and a lower side opening portion 40 where the lower window 28 (refer to FIGS. 1 and 2) formed in the lower portion 32B is disposed. The rear window 24 (refer to FIGS. 1 and 2) is disposed in the upper side opening portion 38. The lower portion 32B of the inner panel 32 is shaped such that its peripheral edge portion protrudes rearward with respect to its part that is on the inner side in the width direction of the vehicle. The outer panel 34 is disposed on the lower side of the lower window 28 (refer to FIGS. 1 and 2). The outer panel 34 is configured to be joined to the peripheral edge portion of the lower portion 32B of the inner panel 32 by an adhesive 44 (described later with reference to FIG. 4).

The inner panel 32 is formed of a material that has a relatively small linear expansion coefficient and is unlikely to thermally elongate so that, for example, rigidity is ensured. For example, the inner panel 32 is formed of iron, an aluminum alloy, carbon-fiber-reinforced plastic (CFRP), or a polypropylene resin (PP resin). According to the first embodiment, the inner panel 32 is made of iron with a linear expansion coefficient k of $1 \times 10^{-7}$ 1/K or CFRP with a linear expansion coefficient k of $0.5 \times 10^{-7}$ 1/K.

The extension 36 is a member that is formed to protrude rearward. The extension 36 constitutes a part of the inner panel 32 by being superposed from the rear side of the vehicle onto and joined to the middle portion of the lower portion 32B of the inner panel 32 in the width direction of the vehicle. The extension 36 may be formed of, for example, the same material as the inner panel 32. Alternatively, the extension 36 and the inner panel 32 may be formed of different materials.

The outer panel 34 is disposed to face the lower portion 32B of the inner panel 32 in the front-rear direction of the vehicle on the rear side of the inner panel 32 of the vehicle (outer side of the vehicle). The outer panel 34 constitutes the design surface of the back door 16. In the back door 16 according to the first embodiment, the outer panel 34 is configured as an outer lower panel.

The outer panel 34 is disposed on the rear side of the extension 36 disposed in the lower portion 32B of the inner panel 32. The outer panel 34 is disposed to cover the extension 36 and face the wall beneath the opening portion 40 in the lower portion 32B of the inner panel 32. A stepped portion 42 is disposed on the lower side of the outer panel 34 in the up-down direction of the vehicle. The stepped portion 42 is formed in an inverted U-shape in rear view of the vehicle. The stepped portion 42 is configured to have a step formed from the front side of the vehicle toward the rear side of the vehicle. More specifically, a front side vertical wall portion 35A is formed in the middle portion of the lower portion of the outer panel 34 in the width direction of the vehicle and the front side vertical wall portion 35A is disposed substantially along the up-down and width directions of the vehicle. The stepped portion 42 is provided with a stepped wall 42A obliquely extending substantially rearward from the peripheral edge portion of the front side vertical wall portion 35A. In addition, the outer panel 34 is provided with a rear side vertical wall portion 35C disposed substantially along the up-down and width directions of the vehicle from the rear end portion of the stepped wall 42A (refer to FIG. 6). In other words, the stepped portion 42 in the lower portions in the up-down direction of the vehicle that are disposed in both end portions of the outer panel 34 in the width direction of the vehicle is provided with the stepped wall 42A obliquely extending from the front side vertical wall portion 35A toward the rear side of the vehicle and the outer sides in the width direction of the vehicle (refer to FIG. 6). The rear side vertical wall portion 35C is disposed on the outer panel 34 and the rear side vertical wall portion 35C extends from the rear end portion of the stepped wall 42A to the outer side in the width direction of the vehicle.

In order to improve the surface quality, to further reduce the weight, and to further increase the degree of freedom in shape of the outer panel 34, the outer panel 34 is formed of a material that has a linear expansion coefficient larger than the linear expansion coefficient of the inner panel 32 and is more likely to thermally elongate than the inner panel 32. For example, the outer panel 34 is formed of a polypropylene resin (PP resin), polycarbonate (PC), or an acrylonitrile-butadiene-styrene (ABS) copolymer resin. According to the first embodiment, the outer panel 34 is made of a PP resin with a linear expansion coefficient k of $7 \times 10^{-7}$ 1/K. The outer panel 34 and the inner panel 32 are formed of materials with different linear expansion coefficients as described above. As a result, at a high temperature (such as approximately 80° C.) attributable to paint heating or the like, a thermal elongation difference by a factor of seven to 14 with respect to the inner panel 32 may occur in the outer panel 34.

Figure 6:
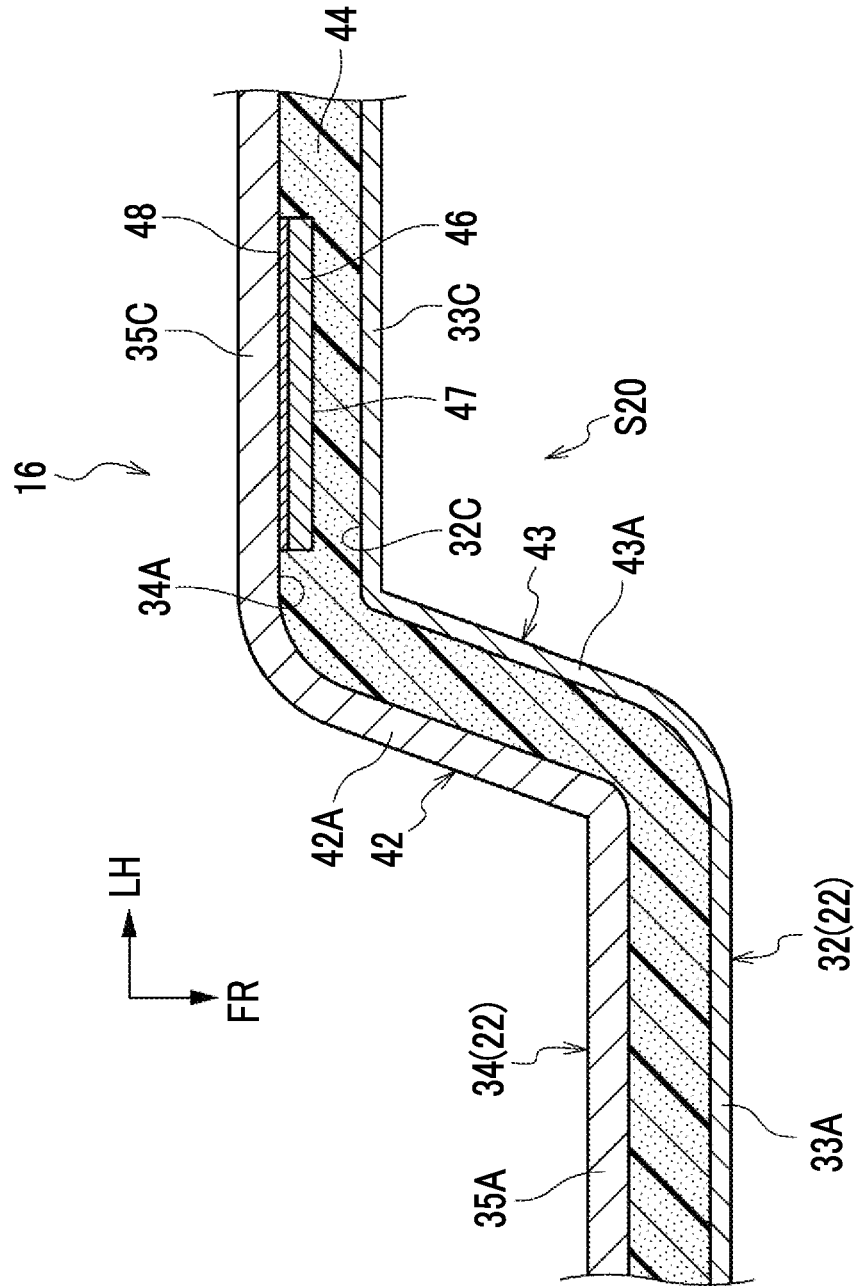
FIG. 6 is an enlarged sectional view illustrating a part at which the outer panel and the inner panel used in the back door to which the vehicular panel structure according to the first embodiment is applied are joined to each other by an adhesive.

A stepped portion 43 is disposed in the lower portion of the inner panel 32 in the up-down direction of the vehicle as illustrated in FIG. 6. The stepped portion 43 is at a position that faces the stepped portion 42 in the outer panel 34 and forms a step from the front side of the vehicle toward the rear side of the vehicle. More specifically, a front side vertical wall portion 33A is disposed in the middle portion of the lower portion of the inner panel 32 in the width direction of the vehicle and the front side vertical wall portion 33A is disposed substantially along the up-down and width directions of the vehicle. The stepped portion 43 is provided with a stepped wall 43A obliquely extending from an edge portion of the front side vertical wall portion 33A toward the rear side of the vehicle and an outer side in the width direction of the vehicle. A rear side vertical wall portion 33C is disposed on the inner panel 32 and the rear side vertical wall portion 33C is disposed substantially along the up-down and width directions of the vehicle from the rear end portion of the stepped wall 43A.

Figure 4:
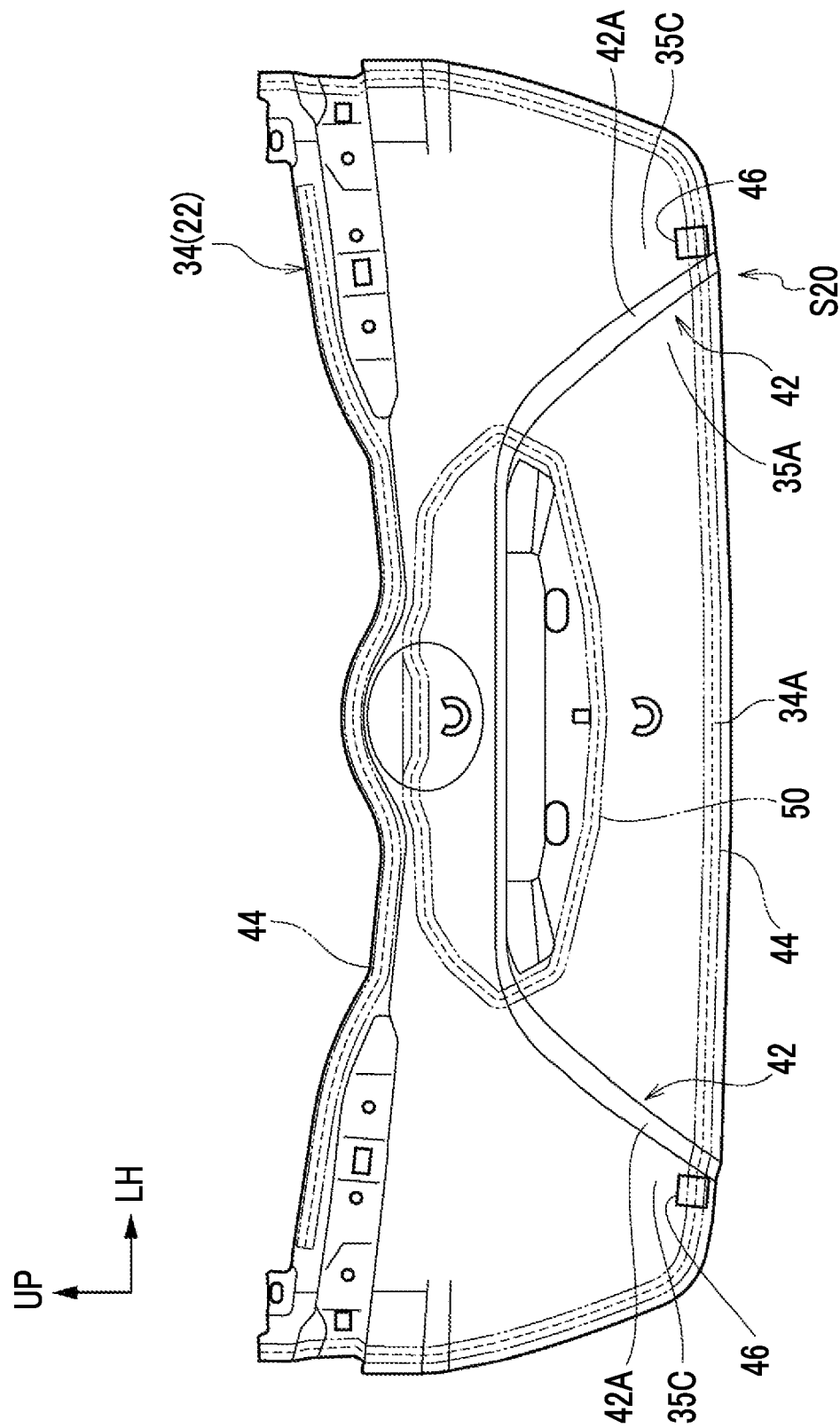
FIG. 4 is a front view illustrating a state where the outer panel used in the back door to which the vehicular panel structure according to the first embodiment is applied is seen from the inner side of the vehicle.
Figure 5:
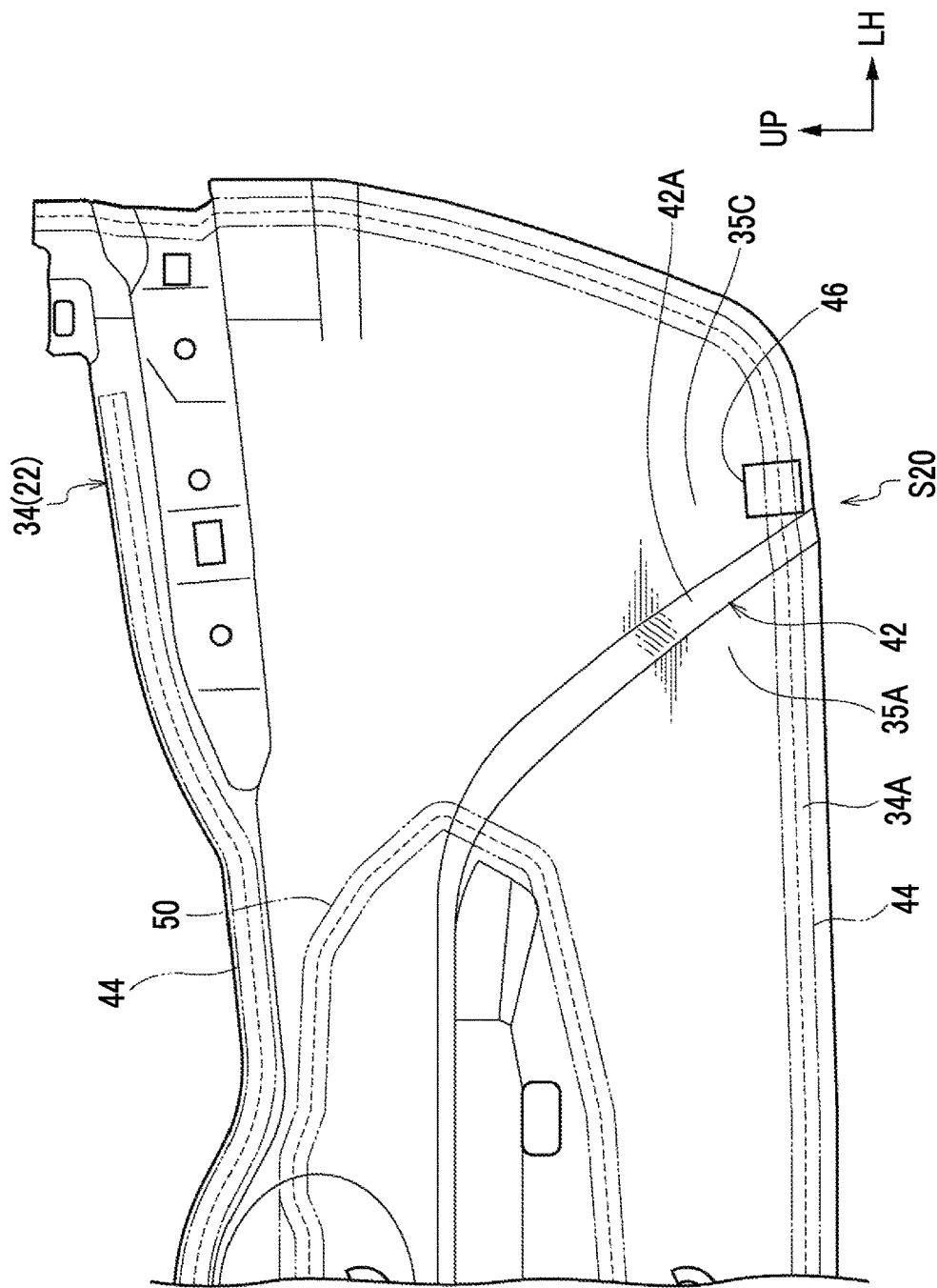
FIG. 5 is an enlarged front view illustrating the state where the outer panel used in the back door to which the vehicular panel structure according to the first embodiment is applied is seen from the inner side of the vehicle.

As illustrated in FIGS. 4 and 5, an adhesive surface 34A is disposed on the outer edge (peripheral edge portion) of the outer panel 34 and an adhesive surface 32C (refer to FIG. 6) is disposed on the outer edge (peripheral edge portion) of the inner panel 32. The adhesive surface 34A of the outer panel 34 and the adhesive surface 32C of the inner panel 32 are joined to each other by the adhesive 44. A material providing a relatively high level of adhesiveness between the adhesive surface 34A of the outer panel 34 and the adhesive surface 32C of the inner panel 32 is selected as the adhesive 44. In the first embodiment, a polyurethane-based adhesive is used as an example of the adhesive 44.

In the middle portion of the outer panel 34 in the width direction of the vehicle, the outer panel 34 and the peripheral edge portion of the extension 36 (refer to FIG. 3) are joined to each other by an adhesive 50.

Figure 8:
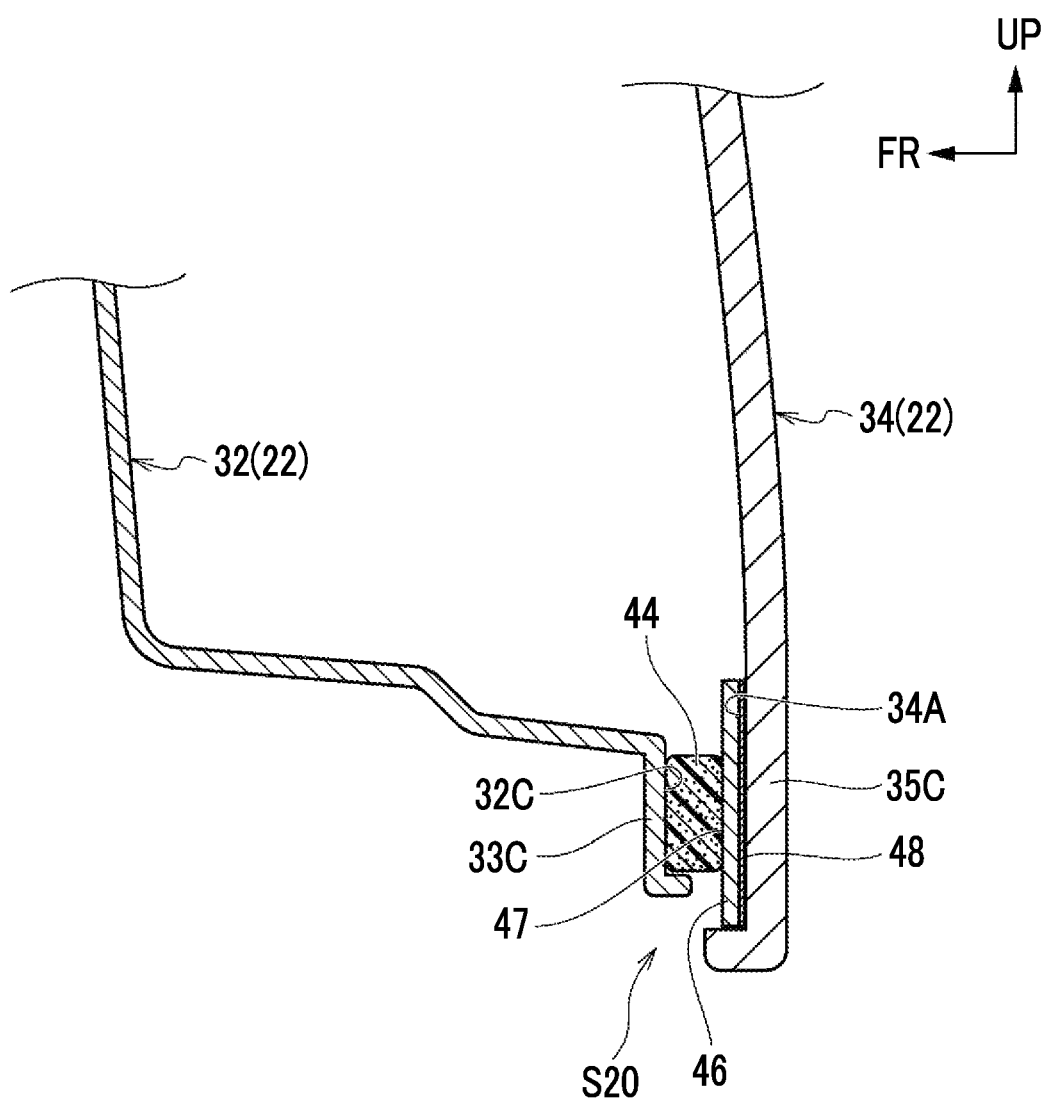
FIG. 8 is a longitudinal sectional view illustrating the part at which the outer panel and the inner panel used in the back door to which the vehicular panel structure according to the first embodiment is applied are joined to each other by the adhesive.

As illustrated in FIGS. 4 to 6, a seal 46 as an affixed member is affixed to the adhesive surface 34A of the rear side vertical wall portion 35C in both end portions of the outer panel 34 in the width direction of the vehicle and the seal 46 is affixed at a position adjacent to the stepped portion 42. In other words, the seal 46 is affixed to the adhesive surface 34A that is adjacent to the stepped portion 42 on the back face of the outer panel 34 (surface on the front side of the vehicle). The seal 46 is configured of a plastic film (tape). The seal 46 is affixed to a part of the adhesive surface 34A of the rear side vertical wall portion 35C of the outer panel 34, that is, a part of the outer edge (peripheral edge portion) of the outer panel 34. As illustrated in FIG. 8, the seal 46 is affixed to a part of the adhesive surface 34A in the lower end portion of the outer panel 34 in the up-down direction of the vehicle. The seal 46 is configured to adhere less to the adhesive 44 than to the adhesive surface 34A of the outer panel 34 to which it is affixed. In other words, the seal 46 is configured to have a relatively high level of adhesiveness with the adhesive surface 34A of the outer panel 34 to which it is affixed and have a relatively low level of adhesiveness with the adhesive 44.

Figure 7:
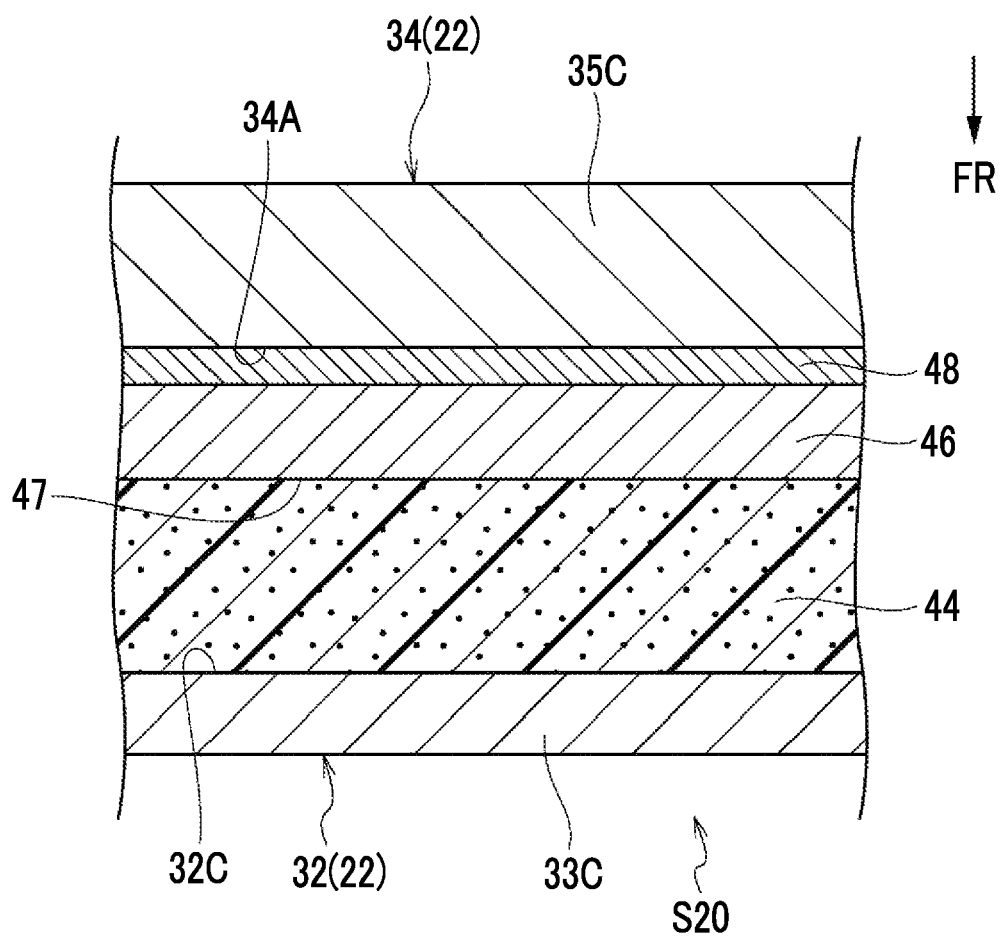
FIG. 7 is a sectional view illustrating the outer panel, inner panel, seal, and adhesive that are illustrated in FIG. 6.

In the vehicular panel structure S20 according to the first embodiment, an adhesive layer 48 is disposed on one surface of the seal 46 and the seal 46 is affixed to the rear side vertical wall portion 35C of the outer panel 34 via the adhesive layer 48 as illustrated in FIGS. 6 and 7. A material that has a relatively high level of adhesiveness with the outer panel 34 is used for the adhesive layer 48. According to the first embodiment, a polyacrylic adhesive layer is used as an example of the adhesive layer 48. Polypropylene (PP), polyethylene (PE), or the like is used as the material of the seal 46 that has a relatively low level of adhesiveness with the adhesive 44. Accordingly, a boundary 47 between the adhesive 44 and the seal 46 is configured such that the adhesive force resulting from the adhesive 44 is rarely exhibited, that is, the bonding strength between the adhesive 44 and the seal 46 is rarely exhibited, although the surface of the seal 46 that is on the side opposite to the adhesive layer 48 is in contact with the adhesive 44. The "affixed member" according to the disclosure is configured to include the seal 46 and the adhesive layer 48. The "affixed member" is configured to have a relatively lower level of adhesiveness with the adhesive 44 than with the adhesive surface 34A of the outer panel 34 to which it is affixed.

In the first embodiment, the seal 46 has, for example, a substantially square shape along with a dimension of 20 mm to 50 mm×20 mm to 50 mm.

Hereinafter, the action and effect of the vehicular panel structure S20 according to the first embodiment will be described.

In the vehicular panel structure S20, the linear expansion coefficient of the outer panel 34 differs from the linear expansion coefficient of the inner panel 32 and the adhesive surface 34A of the outer panel 34 is joined to the adhesive surface 32C of the inner panel 32 by the adhesive 44 (refer to FIG. 6 and so on). The seal 46 is affixed to a part of the adhesive surface 34A of the outer panel 34. The seal 46 adheres less to the adhesive 44 than to the adhesive surface 34A of the outer panel 34 to which it is affixed.

In the vehicular panel structure S20 described above, the seal 46 is affixed to a part of the adhesive surface 34A of the outer panel 34 and the seal 46 adheres less to the adhesive 44 than to the adhesive surface 34A of the outer panel 34 to which it is affixed. As a result, in the region to which the seal 46 is affixed, a state occurs where the outer panel 34 is not bound by the adhesive 44. In other words, a state of almost no adhesion (non-adhesive portion) occurs in the region. Accordingly, the distortion that is attributable to the difference between the linear expansion coefficients of the inner panel 32 and the outer panel 34 can be more effectively avoided. In the vehicular panel structure S20, the dimension of the seal 46 and the position to which the seal 46 is affixed can be adjusted with ease, and thus positional variations can be reduced compared to, for example, a configuration in which a one-side adhesive portion is disposed as a result of a primer treatment.

In the vehicular panel structure S20, the adhesive 44 causes the outer edge of the inner panel 32 and the outer edge of the outer panel 34 to adhere to each other and the seal 46 is disposed at a part of the outer edge of the outer panel 34 (refer to FIGS. 4 and 5). Adhesiveness is ensured between the inner panel 32 and the outer panel 34 as the outer edge of the inner panel 32 and the outer edge of the outer panel 34 are caused to adhere to each other by the adhesive 44. In addition, by the seal 46 being disposed at a part of the outer edge of the outer panel 34, a state occurs where a part of the outer edge of the outer panel 34 is not bound by the adhesive 44, that is, a state of almost no adhesion (non-adhesive portion). As a result, the distortion that is attributable to the difference between the linear expansion coefficients of the inner panel 32 and the outer panel 34 can be more effectively avoided with adhesiveness ensured between the inner panel 32 and the outer panel 34.

In the vehicular panel structure S20, the stepped portion 42 is disposed at a part of the outer panel 34 and the seal 46 is disposed adjacent to the stepped portion 42 (refer to FIGS. 4 to 6). Although stress concentration, and distortion in particular, are likely to occur in the vicinity of the stepped portion 42 of the outer panel 34, the distortion that is attributable to the difference between the linear expansion coefficients of the inner panel 32 and the outer panel 34 can be more effectively avoided as the seal 46 is disposed adjacent to the stepped portion 42.

In the vehicular panel structure S20, the inner panel 32 and the outer panel 34 constitute the back door 16 and the seal 46 is disposed in the lower end portion of the back door 16 in the up-down direction of the vehicle (refer to FIG. 8). In the region of the outer panel 34 to which the seal 46 is affixed, a state occurs where the outer panel 34 rarely adheres to the adhesive 44 (non-adhesive portion) while the adhesive 44 is in close contact with the outer panel 34 via the inner panel 32 and the seal 46. At this time, the seal 46 is disposed in the lower end portion of the back door 16 in the up-down direction of the vehicle, and the dew condensation water generated in the back door 16 can be discharged by oozing out between the seal 46 and the adhesive 44 (boundary 47) and dust and sound movements into the cabin of the vehicle can be further suppressed.

In the vehicular panel structure S20, the seal 46 is affixed to the outer panel 34 side, that is, the design surface side. As a result, distortion of the outer panel 34 as a design surface can be more effectively avoided.

Figure 12A:
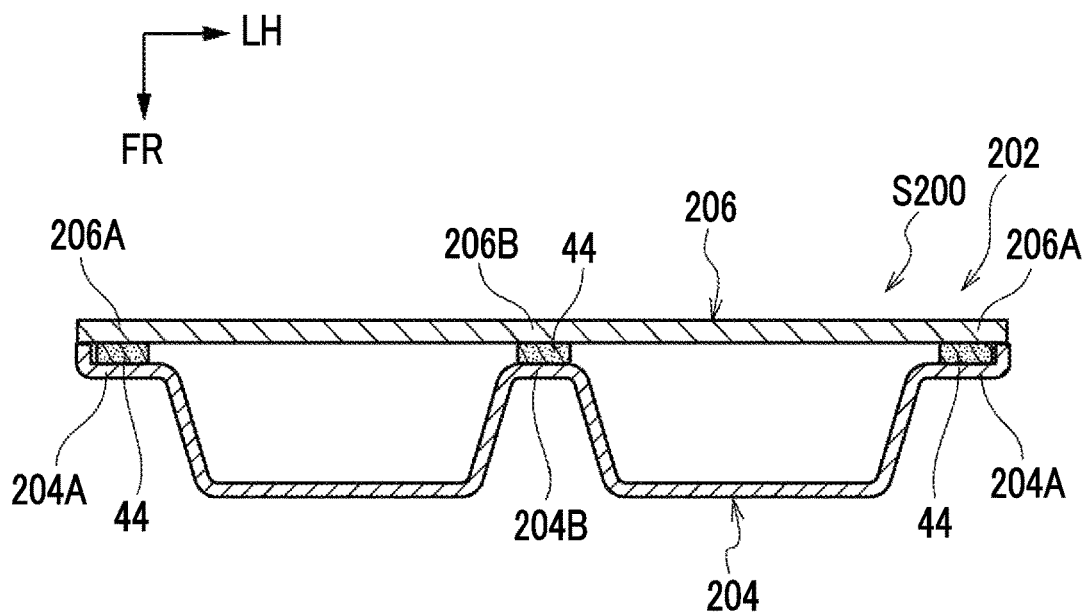
FIG. 12A is a sectional view illustrating a state where a back door to which a vehicular panel structure according to a comparative example is applied is at a normal temperature without deformation.
Figure 12B:
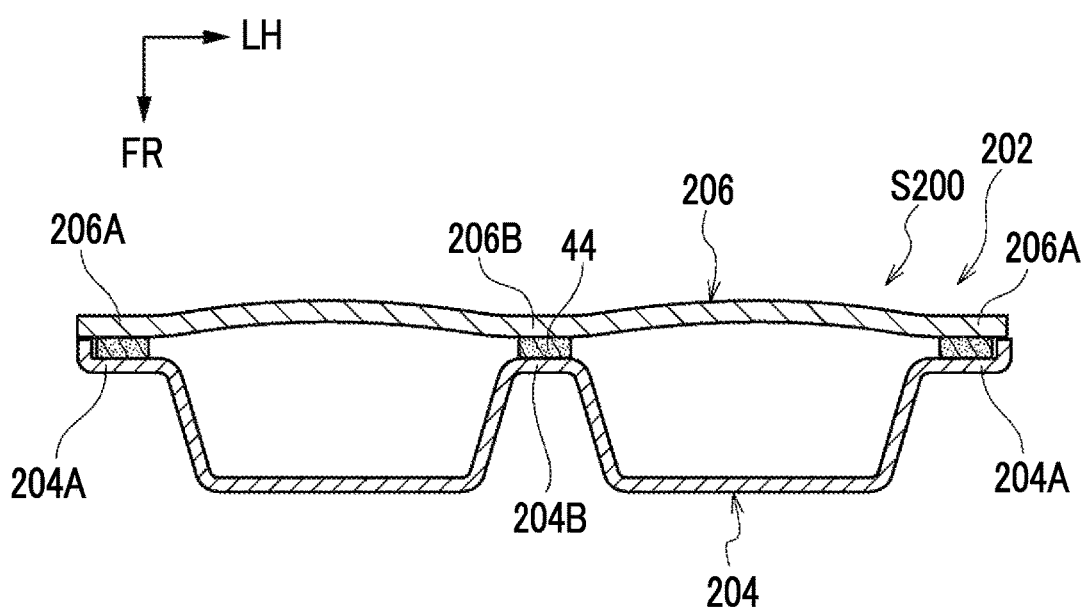
FIG. 12B is a sectional view illustrating a state where the back door to which the vehicular panel structure according to the comparative example is applied is deformed at a high temperature.
Figure 13:
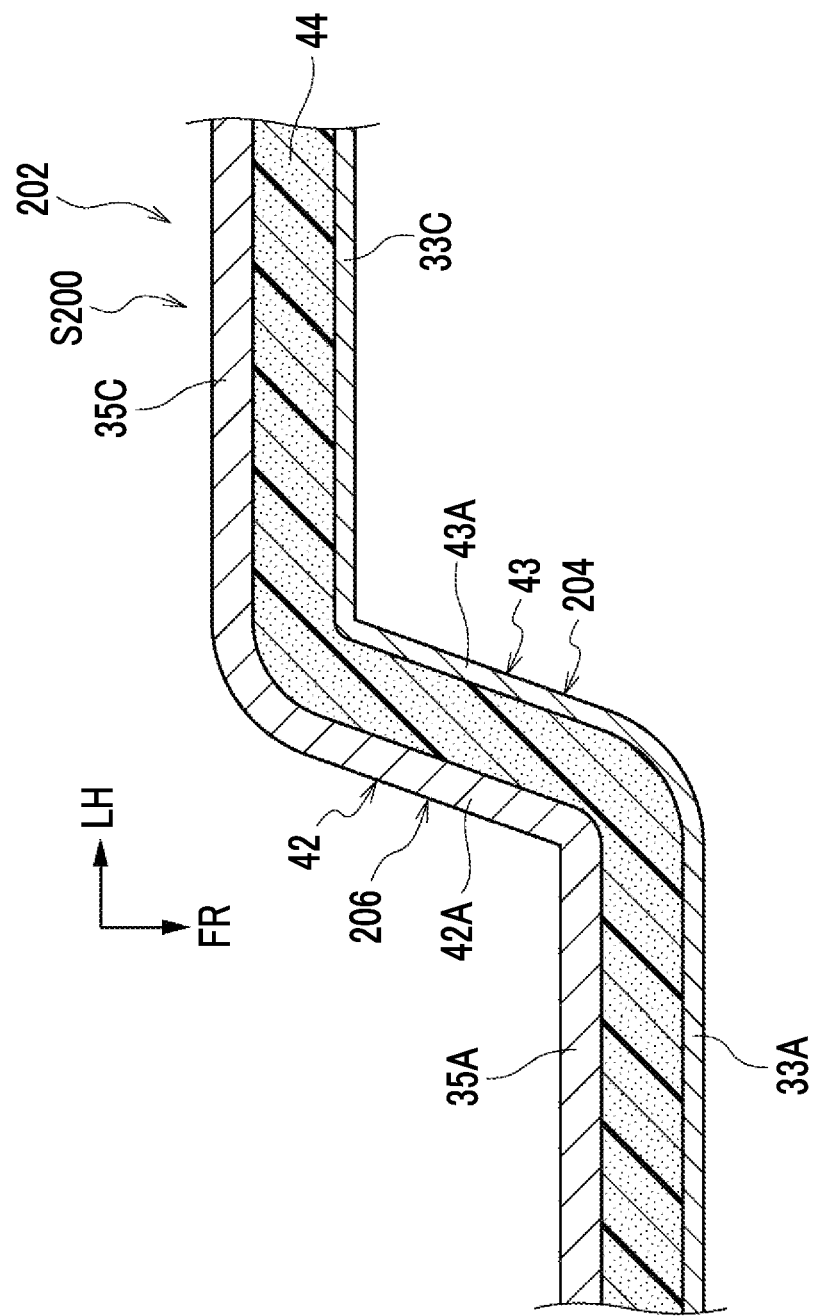
FIG. 13 is an enlarged sectional view illustrating a part at which an outer panel and an inner panel of the back door to which the vehicular panel structure according to the comparative example is applied are joined to each other by an adhesive.

FIGS. 12A and 12B are sectional views illustrating a back door 202 that is cut along the width direction of the vehicle. A vehicular panel structure S200 according to a comparative example is applied to the back door 202. FIG. 13 is an enlarged sectional view of the back door 202 to which the vehicular panel structure S200 according to the comparative example is applied.

FIG. 12A shows a state where the back door 202 is at a normal temperature without deformation and FIG. 12B shows a state where the back door 202 is deformed at a high temperature (such as approximately 80° C.) during paint heating. As illustrated in FIG. 12A, the back door 202 is provided with an inner panel 204 and an outer panel 206 and a peripheral edge portion 204A of the inner panel 204 and a peripheral edge portion 206A of the outer panel 206 are joined to each other by the adhesive 44. A protruding portion 204B protruding to the outer panel 206 is formed in the middle portion of the inner panel 204 in the width direction of the vehicle and the protruding portion 204B of the inner panel 204 is joined by the adhesive 44 to a middle portion 206B of the outer panel 206 in the width direction of the vehicle.

As illustrated in FIG. 13, the stepped portion 42 is formed on the outer panel 206 and the stepped portion 43 is formed at the position of the inner panel 204 that faces the stepped portion 42. The stepped portion 42 of the outer panel 206 and the stepped portion 43 of the inner panel 204 are joined to each other by the adhesive 44. The inner panel 32 is formed of a material that has a relatively small linear expansion coefficient and is unlikely to thermally elongate. The outer panel 34 is formed of a material that has a linear expansion coefficient larger than the linear expansion coefficient of the inner panel 32 and is more likely to thermally elongate than the inner panel 32.

In the vehicular panel structure S200 according to the comparative example, the outer panel 206 is likely to thermally elongate with respect to the inner panel 204 as illustrated in FIG. 12B once the back door 202 reaches a high temperature (such as approximately 80° C.) during paint heating. At this time, the peripheral edge portion 206A of the outer panel 206 and the middle portion 206B of the outer panel 206 in the width direction of the vehicle are joined to the inner panel 204 via the adhesive 44. As a result, the vicinity of the region to which the adhesive 44 is attached becomes a portion of sudden rigidity change and distortion occurs in the outer panel 206. Then, the distortion may still remain in the outer panel 206 even after the back door 202 is cooled and the surface quality of the outer panel 206 may deteriorate.

In the vehicular panel structure S20 according to the first embodiment, in contrast, the seal 46 is affixed to the part of the outer panel 34 that is disposed adjacent to the stepped portion 42 and the region to which the seal 46 is affixed is in a state of not being bound by the adhesive 44, that is, a state of almost no adhesion (refer to FIGS. 4 to 6). Although stress concentration, and distortion in particular, are likely to occur in the vicinity of the stepped portion 42 of the outer panel 34, the distortion that is attributable to the difference between the linear expansion coefficients of the inner panel 32 and the outer panel 34 can be more effectively avoided as the seal 46 is disposed adjacent to the stepped portion 42.

Second Embodiment

Hereinafter, a vehicular panel structure according to a second embodiment will be described with reference to FIG. 9. The same reference numerals will be used to refer to the components, members, and the like that are common to the first and second embodiments, and detailed description thereof will be omitted.

Figure 9:
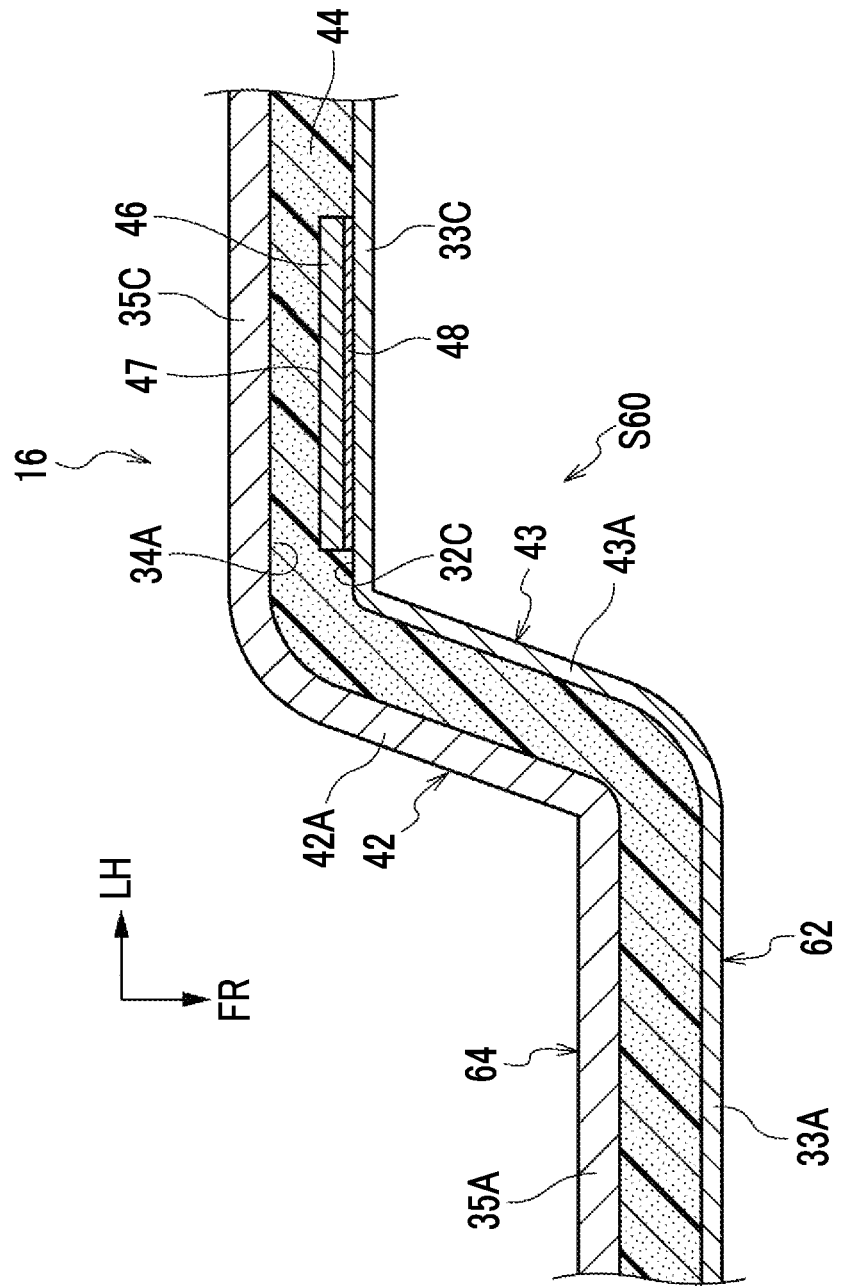
FIG. 9 is an enlarged sectional view illustrating a part at which an outer panel and an inner panel used in a back door to which a vehicular panel structure according to a second embodiment is applied are joined to each other by an adhesive.

As illustrated in FIG. 9, a back door 16 to which a vehicular panel structure S60 according to the second embodiment is applied is provided with an inner panel 62 and an outer panel 64. A stepped portion 42 is formed on the outer panel 64 and a stepped portion 43 is formed at the position of the inner panel 62 that faces the stepped portion 42. In the vehicular panel structure S60, a seal 46 as an affixed member is affixed to the position of an adhesive surface 32C of a rear side vertical wall portion 33C of the inner panel 62 that is adjacent to the stepped portion 43. A material that has a relatively high level of adhesiveness with the inner panel 62 is used for an adhesive layer 48 of the seal 46. The seal 46 is configured to adhere less to an adhesive 44 than to the adhesive surface 32C of the inner panel 62 to which it is affixed. In other words, the seal 46 is configured to have a relatively high level of adhesiveness with the adhesive surface 32C of the inner panel 62 to which it is affixed and have a relatively low level of adhesiveness with the adhesive 44.

The inner panel 32 is formed of a material that has a relatively small linear expansion coefficient and is unlikely to thermally elongate. For example, the inner panel 32 is formed of iron, an aluminum alloy, carbon-fiber-reinforced plastic (CFRP), or a polypropylene resin (PP resin).

The outer panel 64 is formed of a material that has a linear expansion coefficient larger than the linear expansion coefficient of the inner panel 62 and is more likely to thermally elongate than the inner panel 62. For example, the outer panel 64 is formed of a polypropylene resin (PP resin), polycarbonate (PC), or an acrylonitrile-butadiene-styrene (ABS) copolymer resin.

In the vehicular panel structure S60, the seal 46 is affixed to a part of the adhesive surface 32C of the inner panel 62 and the seal 46 adheres less to the adhesive 44 than to the adhesive surface 32C of the inner panel 62 to which it is affixed. As a result, in the region to which the seal 46 is affixed, a state occurs where the inner panel 62 is not bound by the adhesive 44. In other words, a state of almost no adhesion occurs in the region. Accordingly, the distortion that is attributable to the difference between the linear expansion coefficients of the inner panel 62 and the outer panel 64 can be more effectively avoided. In the vehicular panel structure S60, the dimension of the seal 46 and the position to which the seal 46 is affixed can be adjusted with ease, and thus positional variations can be reduced compared to, for example, a configuration in which a one-side adhesive portion is disposed as a result of a primer treatment.

Third Embodiment

Hereinafter, a vehicular panel structure according to a third embodiment will be described with reference to FIGS. 10 and 11. In the third embodiment, the same reference numerals will be used to refer to the components, members, and the like that are common to the first to second embodiments, and detailed description thereof will be omitted.

Figure 10:
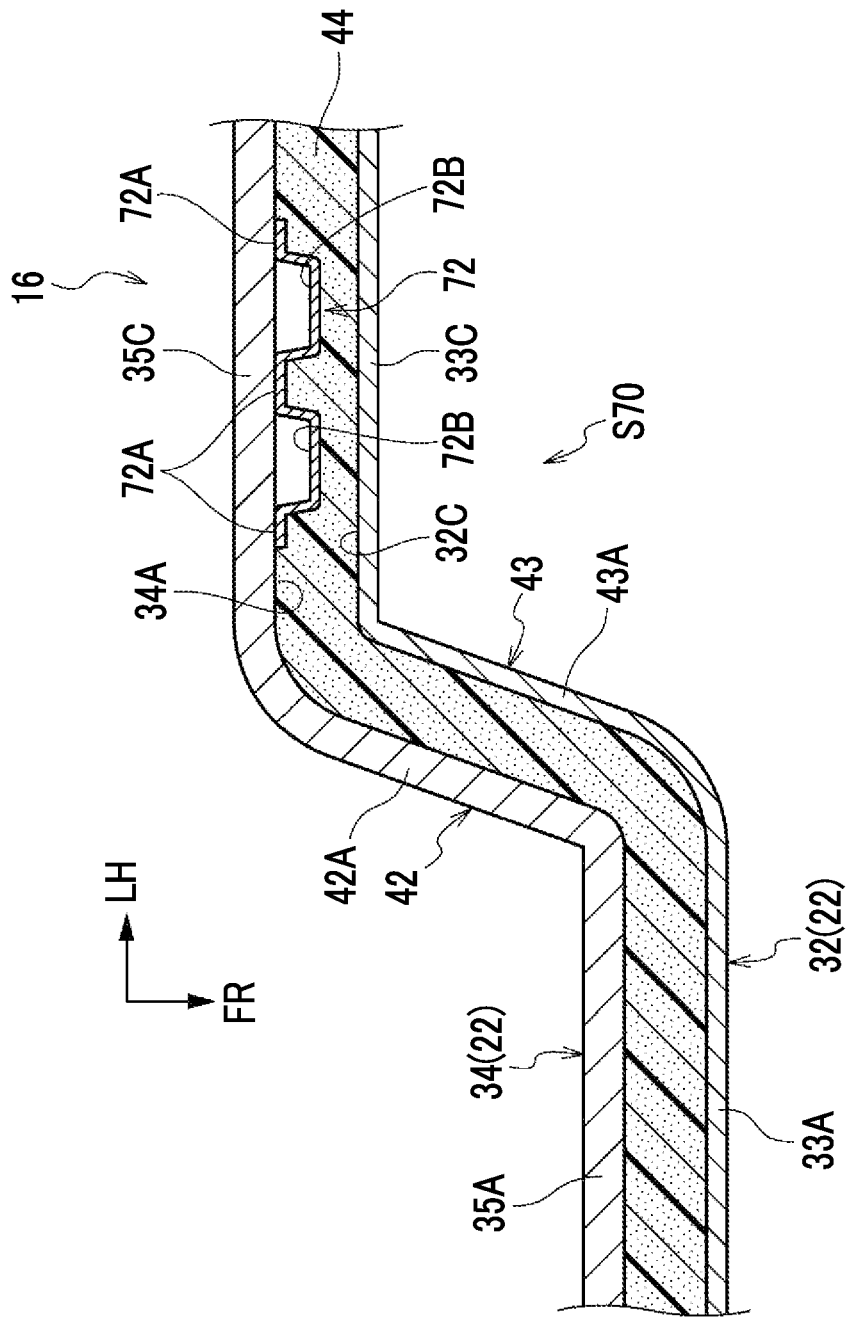
FIG. 10 is an enlarged sectional view illustrating a part at which an outer panel and an inner panel used in a back door to which a vehicular panel structure according to a third embodiment is applied are joined to each other by an adhesive.
Figure 11:
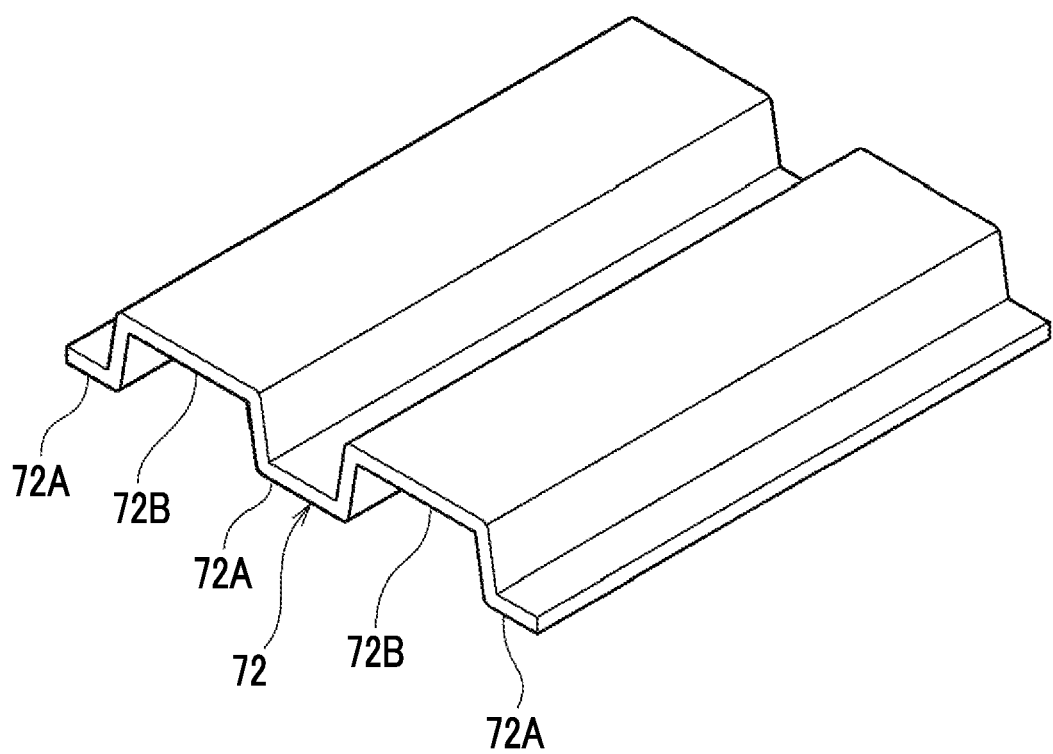
FIG. 11 is a perspective view illustrating an affixed member used in the back door to which the vehicular panel structure according to the third embodiment is applied.

As illustrated in FIG. 10, a back door 16 to which a vehicular panel structure S70 according to the third embodiment is applied is provided with an inner panel 32 and an outer panel 34. An affixed member 72 is affixed to the position of an adhesive surface 34A of a rear side vertical wall portion 35C of the outer panel 34 that is adjacent to a stepped portion 42. The affixed member 72 is a resin-molded article and is provided with three planar joined portions 72A and two recessed portions 72B as illustrated in FIGS. 10 and 11. The planar joined portions 72A are joined to the adhesive surface 34A of the outer panel 34 and the recessed portions 72B are recessed from the planar joined portions 72A to the front side of the vehicle in the intermediate portion of the planar joined portions 72A in the width direction of the vehicle. The two recessed portions 72B of the affixed member 72 according to the third embodiment are spaced apart from each other in the intermediate portion of the planar joined portions 72A in the width direction of the vehicle. The planar joined portions 72A are disposed in three different places, one being between the two recessed portions 72B and the rest being both sides of the recessed portions 72B. The recessed portions 72B are configured such that the recessed parts pass along the up-down direction of the vehicle in a state where the planar joined portions 72A adhere to the adhesive surface 34A of the rear side vertical wall portion 35C of the outer panel 34.

The affixed member 72 is configured to adhere less to an adhesive 44 than to the adhesive surface 34A of the outer panel 34 to which it is affixed. In other words, the affixed member 72 is configured to have a relatively high level of adhesiveness with the adhesive surface 34A of the outer panel 34 to which it is affixed and have a relatively low level of adhesiveness with the adhesive 44. The joined portions 72A of the affixed member 72 are configured to be caused to adhere to the adhesive surface 34A of the rear side vertical wall portion 35C of the outer panel 34 by an adhesive layer (not illustrated). In addition, the affixed member 72 is joined to the adhesive surface 34A in the lower end portion of the outer panel 34 in the up-down direction of the vehicle.

In the vehicular panel structure S70, the affixed member 72 is affixed to a part of the adhesive surface 34A of the outer panel 34 and the affixed member 72 adheres less to the adhesive 44 than to the adhesive surface 34A of the outer panel 34 to which it is affixed. As a result, in the region to which the affixed member 72 is affixed, a state occurs where the outer panel 34 is not bound by the adhesive 44. In other words, a state of almost no adhesion occurs in the region. Accordingly, the distortion that is attributable to the difference between the linear expansion coefficients of the inner panel 32 and the outer panel 34 can be more effectively avoided. In the vehicular panel structure S70, the dimension of the affixed member 72 and the position to which the affixed member 72 is affixed can be adjusted with ease, and thus positional variations can be reduced compared to, for example, a configuration in which a one-side adhesive portion is disposed as a result of a primer treatment.

In the vehicular panel structure S70, the two recessed portions 72B are disposed in the affixed member 72 affixed to the adhesive surface 34A of the outer panel 34 and the two recessed portions 72B pass along the up-down direction of the vehicle. As a result, the dew condensation water generated in the back door 16 can be discharged with a high level of reliability through the two recessed portions 72B of the affixed member 72.

In the vehicular panel structure S70 according to the third embodiment, the affixed member 72 is formed such that the two recessed portions 72B pass along the up-down direction of the vehicle. However, the disclosure is not limited thereto and the number of the recessed portions may be changed to one or two or more. In the vehicular panel structure S70 according to the third embodiment, the affixed member 72 is affixed to the adhesive surface 34A of the outer panel 34. However, the disclosure is not limited thereto and the affixed member 72 may be affixed to an adhesive surface 32C of the inner panel 32 instead.

The vehicular panel structure S20, S60, S70 according to the first to third embodiments is applied to the back door 16. However, the disclosure is not limited to the configuration described above. The vehicular panel structure according to the disclosure may be applied to vehicle members other than the back door such as a hood, a side door, and a roof.

The embodiments of the disclosure described above are merely examples and can be implemented in various modified forms. It is a matter of course that the scope of the disclosure is not limited by the embodiments and the disclosure can be implemented in various aspects.

What is claimed is:

1. A vehicular panel structure comprising:
   an inner panel disposed on an inner side of a vehicle;
   an outer panel disposed on an outer side of the inner panel, having a linear expansion coefficient different from a linear expansion coefficient of the inner panel, and having an adhesive surface joined by an adhesive to an adhesive surface of the inner panel; and
   an affixed member affixed to a part of the adhesive surface of the inner panel or the adhesive surface of the outer panel, the affixed member being configured to adhere less to the adhesive than to the adhesive surface of the inner panel or the adhesive surface of the outer panel to which the affixed member is affixed, wherein:
   the inner panel and the outer panel constitute a door of the vehicle; and
   the affixed member is disposed in a lower end portion of the door in an up-down direction of the vehicle.

2. The vehicular panel structure according to claim 1, wherein:
   the adhesive causes an outer edge of the inner panel and an outer edge of the outer panel to adhere to each other; and the affixed member is disposed at a part of the outer edge of the inner panel or the outer edge of the outer panel.

3. The vehicular panel structure according to claim 1, wherein:
a stepped portion is disposed on at least a part of the inner panel and the outer panel; and
the affixed member is disposed adjacent to the stepped portion.

4. The vehicular panel structure according to claim 1, wherein the affixed member is affixed to the outer panel side, the outer panel side being a design surface side.

5. A vehicular panel structure comprising:
an inner panel disposed on an inner side of a vehicle;
an outer panel disposed on an outer side of the inner panel, having a linear expansion coefficient different from a linear expansion coefficient of the inner panel, and having an adhesive surface joined by an adhesive to an adhesive surface of the inner panel; and
an affixed member affixed to a part of the adhesive surface of the inner panel or the adhesive surface of the outer panel, the affixed member being configured to adhere less to the adhesive than to the adhesive surface of the inner panel or the adhesive surface of the outer panel to which the affixed member is affixed,
wherein the affixed member is a resin-molded article and is provided with a plurality of planar joined portions and a plurality of recessed portions molded in an intermediate portion of the planar joined portions.

6. The vehicular panel structure according to claim 5, wherein the joined portions of the affixed member are joined to the adhesive surface of the outer panel at a position of a rear side vertical wall portion of the outer panel adjacent to a stepped portion such that recessed parts of the recessed portions pass along an up-down direction of the vehicle.

7. A vehicular panel structure comprising:
an inner panel disposed on an inner side of a vehicle;
an outer panel disposed on an outer side of the inner panel, having a linear expansion coefficient different from a linear expansion coefficient of the inner panel, and having an adhesive surface joined by an adhesive to an adhesive surface of the inner panel; and
an affixed member affixed to a part of the adhesive surface of the inner panel or the adhesive surface of the outer panel, the affixed member being configured to adhere less to the adhesive than to the adhesive surface of the inner panel or the adhesive surface of the outer panel to which the affixed member is affixed,
wherein the affixed member is configured of a polypropylene resin.

8. A vehicular panel structure comprising:
an inner panel disposed on an inner side of a vehicle;
an outer panel disposed on an outer side of the inner panel, having a linear expansion coefficient different from a linear expansion coefficient of the inner panel, and having an adhesive surface joined by an adhesive to an adhesive surface of the inner panel; and
an affixed member affixed to a part of the adhesive surface of the inner panel or the adhesive surface of the outer panel, the affixed member being configured to adhere less to the adhesive than to the adhesive surface of the inner panel or the adhesive surface of the outer panel to which the affixed member is affixed,
wherein the affixed member is configured of a polyethylene.

* * * * *